US008667253B2

(12) United States Patent
Frazier et al.

(10) Patent No.: US 8,667,253 B2
(45) Date of Patent: Mar. 4, 2014

(54) INITIATING ASSIST THREAD UPON ASYNCHRONOUS EVENT FOR PROCESSING SIMULTANEOUSLY WITH CONTROLLING THREAD AND UPDATING ITS RUNNING STATUS IN STATUS REGISTER

(75) Inventors: Giles R. Frazier, Austin, TX (US); Venkat R. Indukuru, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 794 days.

(21) Appl. No.: 12/849,903

(22) Filed: Aug. 4, 2010

(65) Prior Publication Data
US 2012/0036339 A1 Feb. 9, 2012

(51) Int. Cl.
*G06F 9/50* (2006.01)
(52) U.S. Cl.
USPC ............... 712/28; 712/31; 718/104; 718/106
(58) Field of Classification Search
None
See application file for complete search history.

(56) References Cited

U.S. PATENT DOCUMENTS

| | | | |
|---|---|---|---|
| 5,978,857 A | 11/1999 | Graham | |
| 6,105,055 A | 8/2000 | Pizano et al. | |
| 6,233,599 B1 | 5/2001 | Nation et al. | |
| 7,434,221 B2 | 10/2008 | Hooper et al. | |
| 7,587,584 B2 | 9/2009 | Enright et al. | |
| 7,610,473 B2 | 10/2009 | Kissell | |
| 7,631,307 B2 | 12/2009 | Wang et al. | |
| 7,676,655 B2 | 3/2010 | Jordan | |
| 2002/0144083 A1 | 10/2002 | Wang | |
| 2002/0199179 A1 | 12/2002 | Lavery | |
| 2005/0071438 A1 | 3/2005 | Liao et al. | |
| 2006/0080661 A1 | 4/2006 | Brokenshire | |
| 2006/0155963 A1 | 7/2006 | Bohrer et al. | |
| 2006/0294347 A1 | 12/2006 | Zou et al. | |
| 2007/0294694 A1 | 12/2007 | Jeter et al. | |
| 2008/0215861 A1 | 9/2008 | Aamodt et al. | |
| 2008/0282064 A1 | 11/2008 | Day et al. | |
| 2009/0106538 A1 | 4/2009 | Bishop et al. | |
| 2009/0199181 A1 | 8/2009 | Arimilli et al. | |
| 2010/0005277 A1 | 1/2010 | Gibert et al. | |

FOREIGN PATENT DOCUMENTS

WO 2011141337 A1 11/2011

OTHER PUBLICATIONS

PCT/EP2011/065565, Written Opinion and International Search Report dated Dec. 15, 2011.
Frazier et al., "Obtaining And Releasing Hardware Threads Without Hypervisor Involvement"; File date: Sep. 20, 2010; U.S. Appl. No. 12/886,091.
Kumar et al., "Lock-Free Asynchronous Rendezvous Design for MPI Point-to-Point Communication," 9 pp.; Dept. of Computer Science and Engineering, The Ohio State University; 2008.
Lu et al., "Dynamic Helper Threaded Prefetching on the Sun UltraSPARC CMP Processor," 12 pp.; 38th Annual IEEE/ACM (MICRO'05), 2005.
Wang et al., "Helper Threads via Virtual Multithreading on an Experimental Itanium 2 Processor-based Platform," 12 pp.; Intel Corp.; ASPLOS'04, Oct. 9-13, 2004, Boston, MA.
Xekalakis et al., "Combining Thread Level Speculation, Helper Threads, and Runahead Execution," 11 pp.; University of Edinburgh; ICS'09, Jun. 8-12, 2009, Yorktown Heights, NY.
Jung et al, "Helper Thread Prefetching for Loosely-Coupled Multi-processor Systems," 10 pp.; Seoul National University, Korea 2006.

*Primary Examiner* — Kenneth Kim
(74) *Attorney, Agent, or Firm* — Yudell Isidore Ng Russell PLLC

(57) ABSTRACT

A processor of a data processing system executes a controlling thread of a program and detects occurrence of a particular asynchronous event during execution of the controlling thread of the program. In response to occurrence of the particular asynchronous event during execution of the controlling thread of the program, the processor initiates execution of an assist thread of the program such that the processor simultaneously executes the assist thread and controlling thread of the program.

13 Claims, 4 Drawing Sheets

INITIATING ASSIST THREAD UPON ASYNCHRONOUS EVENT FOR PROCESSING SIMULTANEOUSLY WITH CONTROLLING THREAD AND UPDATING ITS RUNNING STATUS IN STATUS REGISTER

BACKGROUND OF THE INVENTION

1. Technical Field

The present invention relates in general to data processing, and in particular, to asynchronous initiation of assist threads in a multi-threaded processor.

2. Description of the Related Art

Current processors employ a variety of features to improve performance, including the implementation of superscalar architecture, out-of-order instruction execution, and simultaneous multi-threading (SMT). In SMT, a processor simultaneously executes instructions within multiple independent hardware threads of execution, which may belong to a common program or different programs.

From a program's perspective, the multiple threads of execution supported by the processor hardware can be viewed as independent (virtual) processors, except that various privileged registers or other facilities of a given physical processor may be shared by multiple threads. The performance improvement observed by a program by virtue of SMT depends on the program's capacity for parallelism, that is, whether the overall work to be performed by the program is susceptible to being subdivided in multiple relatively independent units. In many instances, a program includes both sections in which a single thread or only a few threads are useful, as well as one or more additional code sections in which additional threads can be effectively used and after which the additional thread(s) can be released.

Before a program can utilize an additional thread, however, the program is typically required to first request permission to use the additional thread, for example, from a supervisory program that controls thread usage (e.g., an operating system or hypervisor (also referred to as a virtual machine monitor (VMM)). The communication of a request from a requesting program to a supervisory program to obtain permission to utilize an additional thread can be time-consuming, and the concomitant overhead may substantially diminish the performance benefit to the requesting program obtained through the use of the additional thread.

SUMMARY OF THE INVENTION

In one embodiment, a processor of a data processing system executes a controlling thread of a program and detects occurrence of a particular asynchronous event during execution of the controlling thread of the program. In response to occurrence of the particular asynchronous event during execution of the controlling thread of the program, the processor initiates execution of an assist thread of the program such that the processor simultaneously executes the assist thread and controlling thread of the program.

DETAILED DESCRIPTION OF ILLUSTRATIVE EMBODIMENT

Figure 1:
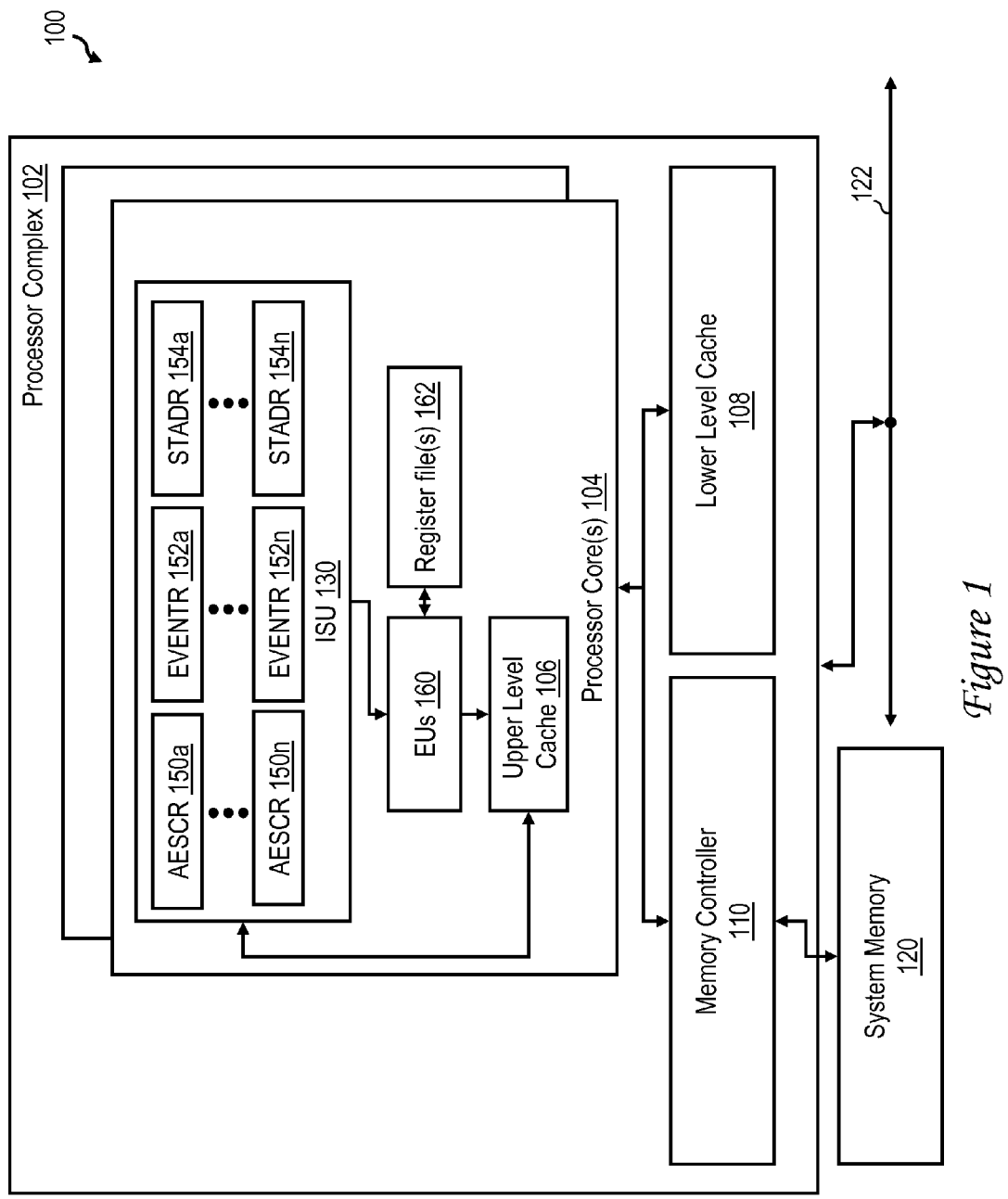
FIG. 1 is high level block diagram of an exemplary data processing system in accordance with one embodiment.

With reference now to FIG. 1, there is illustrated a high level block diagram of an exemplary data processing system 100 according to one embodiment. Data processing system 100 includes one or more (and in some embodiments, a multiplicity of) processor complexes 102, which may be implemented, for example, as a chip multiprocessor (CMP) or a multi-chip module (MCM). Processor complex 102 includes one or more (and in some embodiments, numerous) processor cores 104, each of which includes integrated circuitry for processing data under the direction of instructions. In at least some embodiments, each processor core 104 supports simultaneous execution of multiple independent hardware threads of execution (i.e., SMT).

Each processor core 104 is supported by a cache hierarchy including one or more levels of upper level cache 106 and one or more levels of lower level cache 108. As will be appreciated by those skilled in the art, the cache hierarchy provides processor cores 104 with low latency access to instructions and data retrieved from system memory 120. While it is typical for at least the highest level cache (i.e., that with the lowest access latency) to be on-chip with the associated processor core 104 as shown, the lower levels of cache memory may be implemented as on-chip or off-chip, in-line or lookaside cache, which may be fully inclusive, partially inclusive, or non-inclusive of the contents the upper levels of cache. Lower level cache 108 can be (but is not required to be) shared by multiple processor cores 104, and further can optionally be configured as a victim cache.

Processor complex 102 additionally includes one or more memory controllers (MCs) 110 each controlling read and write access to a system (or main) memory 120, which is the lowest level of storage addressable by the real address space of processor complex(es) 102. Processor complex 102 is further coupled to a system interconnect 122, which may be coupled to a variety of additional components, such as adapters supporting connection of data storage devices, networks, I/O devices and peripheral devices, as well as bridges to additional interconnects.

Still referring to FIG. 1, in addition to upper level cache 106, processor core(s) 104 include an instruction sequencing unit (ISU) 130, which fetches, decodes and orders instructions and then dispatches the instructions for execution to execution units (EUs) 160. Execution units 160 may include multiple execution pipelines that concurrently execute instructions of various types, including, for example, fixed-point, floating-point, vector and branch instructions. In the process of executing instructions, execution units 160 may access instruction operands from and store instruction operands to one or more register files 162, which preferably include an instance of each register file for each hardware thread supported by processor core 104.

Processor core 104 further includes one Asynchronous Event Status and Control Register (AESCR) 150 per thread. Thus, in the depicted embodiment in which processor core 104 supports execution of up to n simultaneous hardware threads, processor core 104 includes AESCRs 150a-150n, each of which is associated with a respective one of the n possible threads. As described further below, the setting of an AESCR 150 enables the spawning of an additional thread (referred to herein as an "assist thread") in response to an occurrence of a specified asynchronous event. In a preferred embodiment, such assist threads perform processing occasioned by the occurrence of the specified asynchronous event, such as input/output (I/O), hardware faults, etc. AESCR 150 additionally provides status information regarding the execution of the assist threads.

In various embodiments, assist threads initiated in response to different asynchronous events can share the same starting address or can have differing starting addresses. In either case, processor threads preferably have a facility (e.g., a register) that indicates (e.g., by an immediate address or offset) the starting address for each assist thread that can be spawned by occurrence of an asynchronous event. In embodiments in which all assist threads begin at the same starting address, the starting address of the corresponding assist thread can be specified as a constant address or indicated within a unitary start address register (STADR). In other embodiments, like that illustrated in FIG. 1, the starting addresses of the assist threads can be indicated by multiple STADRs 154a-154n, each of which corresponds to a respective one of the n threads. In still other embodiments, processor core 104 may include one STADR per event type rather than per thread. In embodiments in which a starting address is shared by multiple threads (meaning that the event type that triggered thread execution is not implied by the starting address), each assist thread preferably has a respective one of event register (EVENTRs) 152a-152n, which indicates to that assist thread the specific event that caused it to be initiated. Thus, to indicate an assist thread starting address and the event type that triggered initiation of assist thread execution, at least four alternative designs are possible:

(1) an EVENTR per assist thread and no STADRs (i.e., a constant assist thread starting address); or
(2) an EVENTR per assist thread and a single STADR (i.e., a shared assist thread starting address); or
(3) a STADR and EVENTR per assist thread (as shown in FIG. 1); or
(4) one STADR per event type, and no EVENTRs (i.e., event type implied by starting address).

Those of ordinary skill in the art will appreciate that the architecture and components of a data processing system can vary between embodiments. For example, other devices and interconnects may alternatively or additionally be used. Accordingly, the exemplary data processing system 100 given in FIG. 1 is not meant to imply architectural limitations with respect to the claimed invention.

Figure 2:
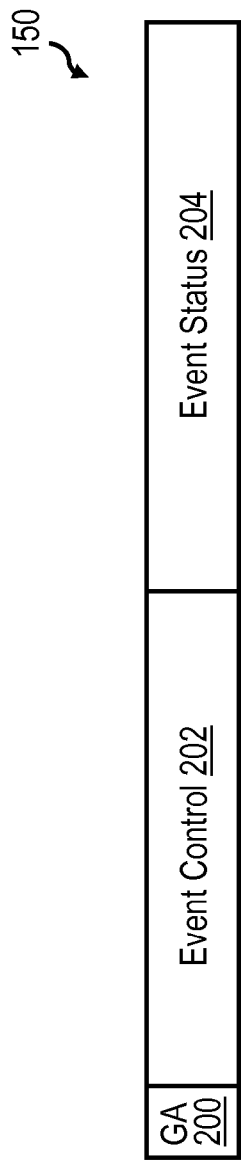
FIG. 2 is a more detailed view of an exemplary embodiment of an Asynchronous Event Status and Control Register (AESCR) in the data processing system of FIG. 1.

Referring now to FIG. 2, there is depicted a more detailed view of an exemplary embodiment of an Asynchronous Event Status and Control Register (AESCR) 150 in data processing system 100 of FIG. 1. In the illustrated embodiment, AESCR 150 includes a global activation (GA) field 200 that, when set (e.g., to 0b1), activates the spawning of assist threads in response to occurrences of asynchronous events and that, when reset (e.g., to 0b0), inhibits the spawning of assist threads in response to occurrences of asynchronous events.

AESCR 150 additional includes an event control field 202 that individually enables or disables the spawning of assist threads in response to occurrences of particular asynchronous events when assist threads are activated by GA field 200. In one preferred embodiment, event control field 202 is implemented as a bit vector in which each bit corresponds to and controls the enablement of initiation of assist threads for a respective asynchronous event. Thus, when a particular bit in event control field 202 is set (e.g., to 0b1), spawning of an assist thread in response to an occurrence of a corresponding asynchronous event is enabled, and when the particular bit is reset (e.g., to 0b0), spawning of an assist thread in response to an occurrence of the corresponding asynchronous event is inhibited. AESCR 150 additionally includes event status field 204, which indicates whether or not an occurrence of each of the asynchronous events of interest has been detected. In one preferred embodiment, event status field 204 is also implemented as a bit vector in which each bit corresponds to and indicates the status for a respective asynchronous event of interest. Thus, in a preferred embodiment, each asynchronous event of interest can be described by a duple comprising one bit from event control field 202 and one bit from event status field 204 as indicated in Table I below:

TABLE I

| Duple | Meaning |
| --- | --- |
| (0, 0) | Asynchronous event is not enabled to cause initiation of an assist thread, and event occurrence has not been detected |
| (0, 1) | Asynchronous event is not currently enabled to cause initiation of an assist thread because an event occurrence has been detected and an assist thread has been or will be initiated |
| (1, 0) | Asynchronous event is enabled to cause initiation of an assist thread, and event occurrence has not been detected |
| (1, 1) | N/A |

Figure 3:
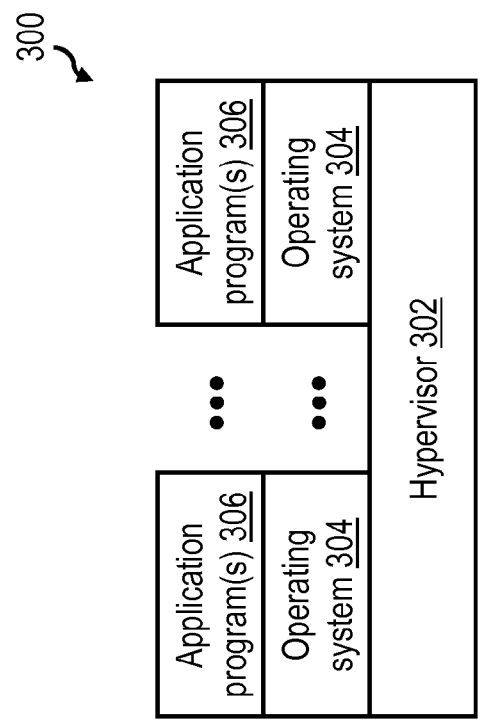
FIG. 3 is a software layer diagram illustrating an exemplary software configuration of the data processing system of FIG. 1 in one embodiment.

With reference now to FIG. 3, there is illustrated a software layer diagram illustrating an exemplary software configuration 300 of the data processing system of FIG. 1. As shown, at the lowest layer, software configuration 300 includes a hypervisor 302 (also referred to as a virtual machine monitor (VMM)). Hypervisor 302, which is typically implemented in firmware, allocates the physical hardware resources of data processing system 100 among one or more concurrently executing operating system instances 304 through an abstraction layer that virtualizes the physical hardware resources of data processing system 100. Hypervisor 302 further enforces partition integrity by providing a security layer between the operating system instances 304. Hypervisor 302 also controls the dispatch of virtual processors to physical processor cores 104, saves and restores all processor state information during logical processor context switches, and controls hardware interrupt facilities for the logical partitions.

Each of the logical partitions supported by hypervisor 302 executes a respective operating system instance 304 that manages the virtual resources allocated to that logical partition by hypervisor 302. Operating system instances 304, which may be homogeneous or heterogeneous, in turn provide an operating environment, allocate virtual resources and provide services to various application programs 306.

In conventional data processing systems, the initiation of an additional thread by an operating system instance or application program requires a call to hypervisor explicitly seeking authorization for the additional thread from a supervisory program, such as a virtual machine monitor (VMM). In contrast, in data processing system 100, an application program 306 or operating system 304 can enable the initiation of an assist thread to assist its own execution in response to occurrence of an asynchronous event utilizing the facilities provided by processor cores 104 without requesting permission by a call to hypervisor 302. Various processes involved in the initiation of an assist thread in response to occurrence of an asynchronous event are illustrated in FIGS. 4-6, which are described below.

Figure 4:
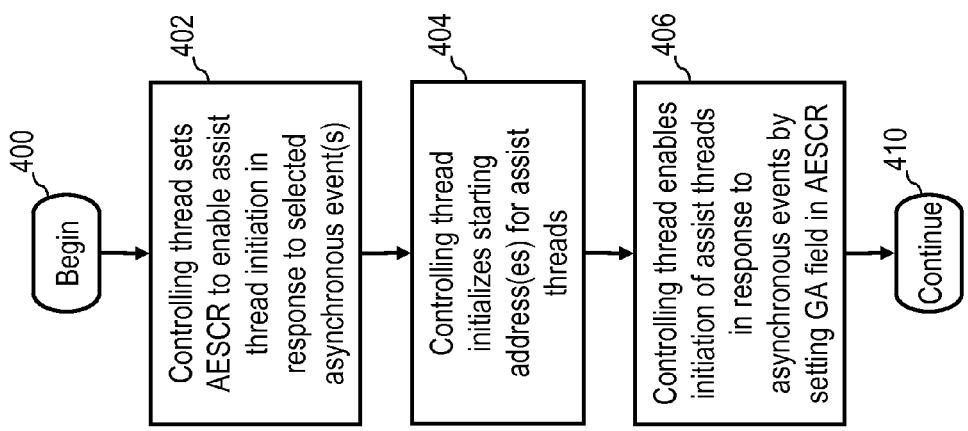
FIG. 4 is a high level logical flowchart of an exemplary process by which a controlling thread of a program enables asynchronous initiation of one or more assist threads of the program in accordance with one embodiment.

Referring now to FIG. 4, there is depicted a high level logical flowchart of an exemplary process by which a controlling thread of a program enables asynchronous initiation of one or more assist threads of that program in accordance with one embodiment.

The process begins at block 400 during execution of a program, such as an application program 306 or an operating system 304. The process proceeds from block 400 to block 402, which illustrates a controlling thread of the program enabling initiation of one or more assist threads in that program in response an occurrence of one or more selected asynchronous events. In a typical embodiment, the controlling thread enables initiation of the one or more assist threads through execution of an instruction that sets selected bits in event control field 202 of its AESCR 150. In addition, the controlling thread of the program initializes the starting address or starting addresses of the one or more assist threads to be initiated by the occurrences of the one or more selected events, for example, by appropriate setting of STADRs 150 through execution of the same instruction executed at block 402 or an additional instruction (block 404). In addition, the controlling thread globally activates initiation of one or more assist threads enabled by event control field 202 of its AESCSR 150 by setting global activation (GA) field 200. Thereafter, processing of the controlling thread of the program continues at block 410.

Figure 5:
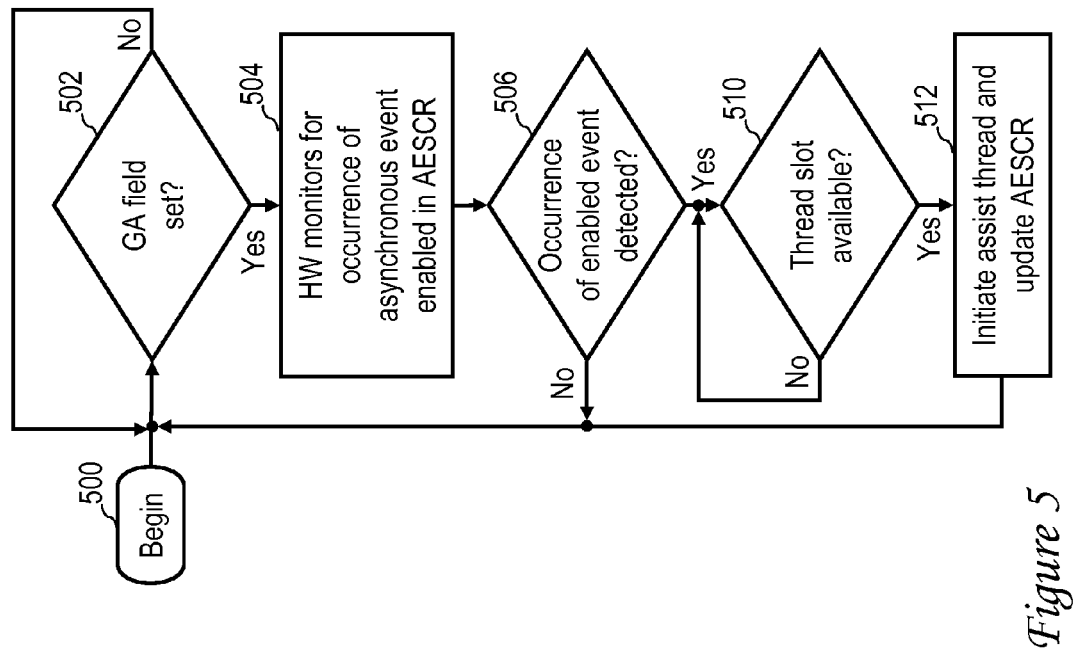
FIG. 5 is a high level logical flowchart of an exemplary process by which an assist thread is asynchronously initiated in response to an occurrence of an asynchronous event in accordance with one embodiment.
Figure 6:
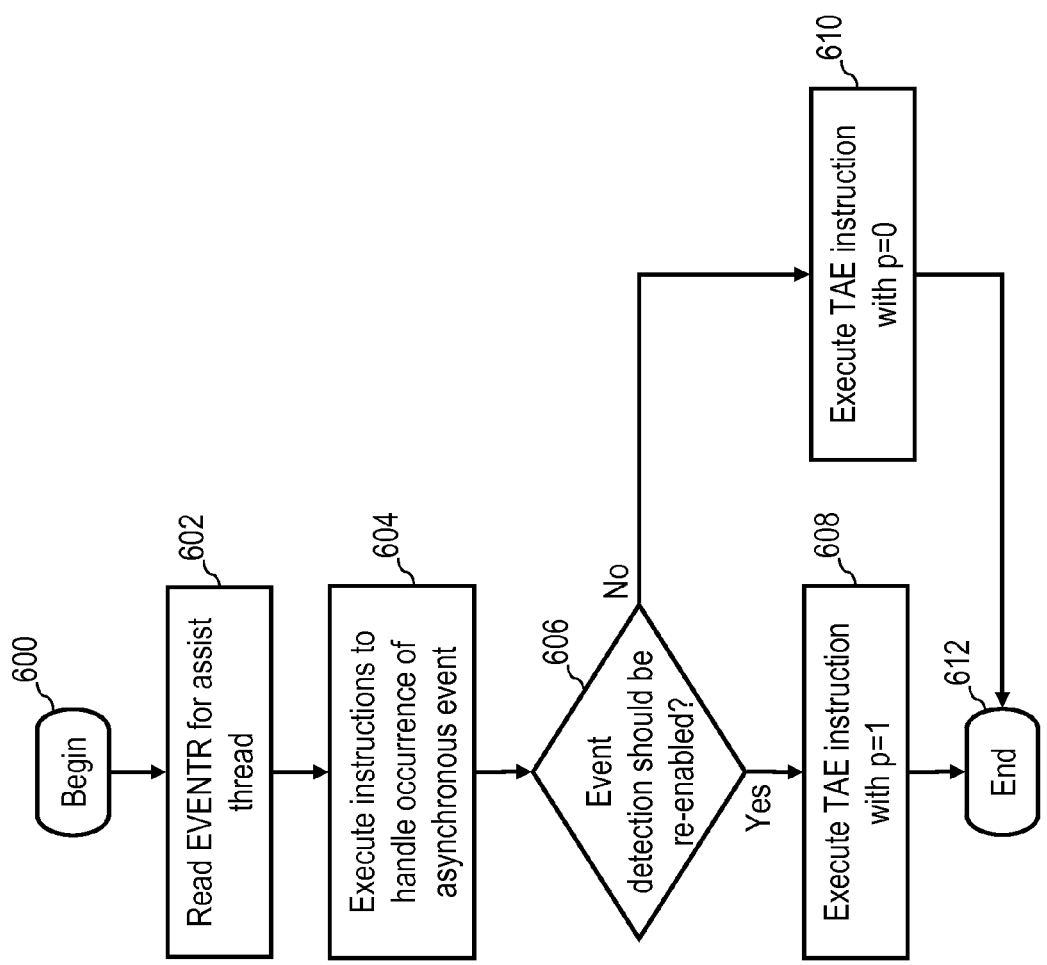
FIG. 6 is a high level logical flowchart of an exemplary process by which an assist thread executes in response to an occurrence of an asynchronous event in accordance with one embodiment.

With reference now to FIG. 5, there is illustrated a high level logical flowchart of an exemplary process by which an assist thread is asynchronously initiated in response to occurrence of an asynchronous event in accordance with one embodiment. The illustrated process begins at block 500 and then proceeds to block 502, which illustrates a determination by event monitoring logic in processor core 104, which may be implemented, for example, in ISU 130, EUs 160, upper level cache 106, unillustrated performance monitoring hardware and/or other logic implemented in processor core 104 in a centralized or distributed manner, determining by reference to the state of global activation (GA) field 200 of an AESCR 150 whether or not the initiation of assist threads in response to occurrences of asynchronous events is activated for a given thread. If not, the process depicted in FIG. 5 iterates at block 502.

In response to a determination at block 502 that global activation (GA) field 200 is set to indicate that the initiation of assist threads in response to occurrences of asynchronous events is activated for a given thread, the event monitoring logic in processor core 104 monitors for an occurrence of any of the asynchronous events indicated as enabled in event control field 202 of the associated AESCR 150. As indicated by block 506, if the event monitoring logic does not detect an occurrence of any of the one or more asynchronous events indicated as enabled in event control field 202 of the AESCR 150, the process returns to block 502, which has been described. If, however, the event monitoring logic detects an occurrence of an asynchronous event indicated as enabled in event control field 202 of the AESCR 150, the event monitoring logic notifies thread initiation logic in processor core 104 (e.g., in ISU 130), which in turn determines at block 510 if processor core 104 presently has the capacity to execute an additional thread, that is, has a thread slot available. If no thread slot is currently available, the process iterates at block 510. Once the thread initiation logic of processor core 104 determines at block 510 that processor core 104 has the capacity to execute an additional thread, the process proceeds to block 512.

Block 512 illustrates the thread initiation logic of processor core 104 initiating execution of an assist thread at the appropriate starting address (as indicated, for example, by the STADR 154 associated with the assist thread or detected asynchronous event). In addition, the thread initiation logic of processor core 104 updates the controlling thread's AESCR 150 by resetting the bit in event control field 202 corresponding to the asynchronous event for which an occurrence was detected and by setting the bit in event control field 204 to indicate that an assist thread is processing in response to the detected occurrence. Thus, the duple describing the asynchronous event is updated from (1,0) to (0,1). Following block 512, the process depicted in FIG. 5 returns to block 502 and following blocks, which have been described.

Referring now to FIG. 6, there is depicted a high level logical flowchart of an exemplary process by which an assist thread of a program executes in response to an occurrence of an asynchronous event in accordance with one embodiment. The execution of the assist thread begins at block 600 in response to initiation of the assist thread by the thread initiation logic of processor core 104, for example, at block 512 of FIG. 5. Following initiation of the assist thread, for example, at a starting address indicated by an STADR 154 associated with the controlling thread or asynchronous event, the assist thread may read its associated EVENTR 152 to determine additional information required for execution, such as the identity of the detected asynchronous event, as shown at block 602. The assist thread then executes additional instructions, preferably to provide processing necessary or desirable to handle the occurrence of the asynchronous event (block 604). As will be appreciated, the specific instructions executed in the assist thread to handle the asynchronous event can, and most likely will, vary between different types of asynchronous events, such as various types of I/O, hardware faults, etc.

At block 606, the assist thread determines whether or not initiation of an assist thread in response to an occurrence of the same asynchronous event should be re-enabled in event control field 202. The assist thread can make the determination illustrated at block 606 based, for example, on a value of an unillustrated control register maintained by the controlling thread of the program and/or the type of the asynchronous event. Following block 606, the assist thread executes a terminate and enable (TAE) instruction that resets the bit corresponding to the asynchronous event in event status field 204 to indicate completion of the assist thread (block 608 or 610). A parameter p of the TAE instruction set in accordance with the determination made at block 606 additionally causes the TAE instruction either to set (p=1) or to refrain from setting (p=0) the bit corresponding to the asynchronous event in event control field 202 of AESCR 150 to re-enable assist thread initiation. Following block 608 or block 610, the process terminates at block 612.

As has been described, in one embodiment, a processor of a data processing system executes a controlling thread of a program and detects occurrence of a particular asynchronous event during execution of the controlling thread of the program. In response to occurrence of the particular asynchronous event during execution of the controlling thread of the program, the processor initiates execution of an assist thread of the program such that the processor simultaneously executes the assist thread and controlling thread of the program. It should be appreciated that in some embodiments an assist thread may be permitted to in turn spawn execution of one or more additional asynchronously initiated assist threads up to a desired thread depth or assist thread count.

While one or more preferred embodiments have been shown and described, it will be understood by those skilled in the art that various changes in form and detail may be made therein without departing from the spirit and scope of the appended claims. For example, although certain aspects have been described with respect to a software and/or firmware that directs particular functions herein disclosed, it should be understood that such functions can alternative be implemented by a program product including a computer-readable storage medium storing program code that can be processed by a data processing system.

As one example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A processor circuit, comprising:
at least one execution unit that executes instructions including those of a controlling thread among a plurality of threads of a program;
event detection logic that detects occurrence of a particular asynchronous event during execution of the controlling thread;
a plurality of status and control registers each associated with a respective one of the plurality of threads, wherein a status and control register among the plurality of status and control registers provides status information to the controlling thread; and
thread initiation logic that, in response to occurrence of the particular asynchronous event during execution of the controlling thread:
initiates execution of an assist thread of the program by the at least one execution unit such that the processor circuit executes the assist thread and controlling thread simultaneously; and
updates the status and control register of the controlling thread to identify to the controlling thread the particular asynchronous event for which the occurrence was detected and to indicate to the controlling thread that the assist thread is currently being executed in response to the occurrence of the particular asynchronous event.

2. The processor circuit of claim 1, wherein the thread initiation logic delays execution of the assist thread until the processor has a thread slot available.

3. The processor circuit of claim 1, wherein:
the processor circuit further includes a starting address register; and
the thread initiation logic initiates execution of the assist thread at a starting address indicated by the starting address register.

4. The processor circuit of claim 1, wherein:
the processor further includes an event register; and
the at least one execution unit executes an instruction in the assist thread to read from the event register information identifying the particular asynchronous event.

5. The processor circuit of claim 1, wherein:
the at least one execution unit, prior to the detection of the occurrence of the particular asynchronous event, executes at least one instruction of the controlling thread to set the status and control register of the controlling thread to enable initiation of the assist thread.

6. The processor circuit of claim 5, wherein:
the assist thread is one of a plurality of assist threads;
the particular asynchronous event is one of a plurality of asynchronous events; and
the at least one execution unit executes the at least one instruction of the controlling thread to set the status and control register to enable initiation of each of the plurality of assist threads in response to occurrence of a respective one of the plurality of asynchronous events.

7. The processor circuit of claim 6, wherein the at least one execution unit executes the at least one instruction of the controlling thread to set the status and control register to globally activate initiation of assist threads in response to occurrences of asynchronous events enabled in the at least one register.

8. The processor circuit of claim 1, wherein:
the thread initiation logic, after initiating the assist thread, sets the status and control register to inhibit initiation of another assist thread in response to another occurrence of the particular asynchronous event while the assist thread is being executed.

9. The processor circuit of claim 8, wherein:
the at least one execution unit, through execution of an instruction in the assist thread that terminates execution of the assist thread, sets the status and control register to re-enable initiation of another assist thread in response to occurrence of the particular asynchronous event.

10. The processor circuit of claim 1, wherein:
the at least one execution unit, during execution of the program, executes a supervisory program that allocates resources to the program; and
the thread initiation logic initiates execution of the assist thread in absence of the program requesting authorization from the supervisory program.

11. The processor circuit of claim 1, wherein the assist thread is one of a plurality of assist threads all sharing a common starting address.

12. The processor circuit of claim 11, wherein:
the processor circuit includes a plurality of event registers each associated with a respective one of the plurality of assist threads, wherein the plurality of event registers includes the event register; and
the at least one execution unit accesses the event register based on the identity of the assist thread.

13. The processor circuit of claim 12, wherein:
the processor circuit includes a starting address register that specifies the common starting address for all of the plurality of threads; and
the thread initiation logic initiates execution of the assist thread at the common starting address by reference to the starting address register.

* * * * *